(12) United States Patent
Seshadri

(10) Patent No.: US 10,861,034 B2
(45) Date of Patent: Dec. 8, 2020

(54) AUGMENTED REALITY BASED GAMIFICATION FOR LOCATION-BASED MAN-MACHINE INTERACTIONS

(71) Applicant: Madhavan Seshadri, Singapore (SG)

(72) Inventor: Madhavan Seshadri, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 290 days.

(21) Appl. No.: 15/967,821

(22) Filed: May 1, 2018

(65) Prior Publication Data

US 2019/0340631 A1 Nov. 7, 2019

(51) Int. Cl.
*G06Q 30/02* (2012.01)
*G06T 11/60* (2006.01)
*A63F 13/792* (2014.01)
*A63F 13/537* (2014.01)

(52) U.S. Cl.
CPC ....... *G06Q 30/0209* (2013.01); *A63F 13/537* (2014.09); *A63F 13/792* (2014.09); *G06T 11/60* (2013.01); *A63F 2300/8082* (2013.01)

(58) Field of Classification Search
CPC ..... G06Q 30/0209; G06T 11/60; G06T 11/00; A63F 13/792; A63F 13/537; A63F 2300/8082; A63F 13/30
See application file for complete search history.

(56) References Cited

U.S. PATENT DOCUMENTS 9,669,296 B1 * 6/2017 Hibbert .................. A63F 13/12
9,901,830 B1 2/2018 Curtis

| 2006/0259361 | A1 | 11/2006 | Barhydt | |
|---|---|---|---|---|
| 2013/0005437 | A1 | 1/2013 | Bethke | |
| 2014/0100996 | A1 | 4/2014 | Klein | |
| 2014/0172640 | A1 * | 6/2014 | Argue | G06Q 30/0641 705/26.61 |
| 2014/0237578 | A1 | 8/2014 | Bryant | |
| 2014/0378211 | A1 * | 12/2014 | Gala | G07F 17/3244 463/25 |
| 2015/0031449 | A1 | 1/2015 | Levi | |

(Continued)

OTHER PUBLICATIONS

Adhani et al. A survey of Mobile Augmented Reality Applications. 2012 1st International Conference on Future Trends in Computing and Communication Technologies, pp. 89-95. (Year: 2012).*

*Primary Examiner* — William A Brandenburg
*Assistant Examiner* — Christopher C Busch
(74) *Attorney, Agent, or Firm* — Loeb & Loeb LLP

(57) ABSTRACT

When a user moves into a geographical region around a location, a notification is sent to the user computing device regarding gameplay and an associated incentive related to a merchant location. The user enters the merchant location and a game server generates augmented reality (AR) data for the computing device to use in playing a game at the merchant location. The camera of the computing device captures interior views of the merchant location and a game instance on the computing device uses those images in generation of an AR game at the user computing device related to the merchant. Upon successful completion of the game play, the user receives an incentive or award. The merchant may use an application program interface (API) hosted by the game server to allow specifying game conditions and related awards.

18 Claims, 9 Drawing Sheets

(56) References Cited

U.S. PATENT DOCUMENTS

2015/0196840 A1* 7/2015 Bell ................... H04W 4/029
                                                   463/25
2016/0154821 A1   6/2016 Kansal

* cited by examiner

US 10,861,034 B2

AUGMENTED REALITY BASED GAMIFICATION FOR LOCATION-BASED MAN-MACHINE INTERACTIONS

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Product and service providers compete for share of mind with consumers by offering coupons and discounts on merchandise and services. Traditional methods of communicating those offers to consumers may be less effective in an increasingly online and digitally-oriented consumer base.

SUMMARY

In an embodiment, a user interacts with an augmented reality environment via a digital system supporting augmented reality views of a merchant premise. A gaming component on the consumer's personal computing device, a gaming platform hosting a game, a merchant system providing game conditions and rewards operate together to provide a gamified augmented reality environment to consumer. Completion of one or more games may qualify the consumer for an award.

BRIEF DESCRIPTION OF THE DRAWINGS

The figures depict a preferred embodiment for purposes of illustration only. Alternative embodiments of the structures and methods illustrated herein may be employed without departing from the principles described herein.

DETAILED DESCRIPTION

Consumers are increasingly turning away from brick and mortar stores in favor of digital experiences including online shopping. In an embodiment, a system combines a digital experience with a brick and mortar retail environment to create a man-machine interaction at a specific location using an augmented reality game that may result in the player receiving an award. The award may include a discount on a purchase, loyalty points, reward points, cashback or statement credits, or completion status for a multiple-part game.

A merchant associated with the retail environment may access the gaming system to specify game attributes and awards. The game platform, that is, a game server or cloud instance supporting the game platform may interact with both the merchant and a computing device used by the consumer to play the game and redeem awards. The attributes and awards may be created and adjusted using a user interface which may be specifically created to make the set up and adjustment process efficient and effective.

It will be understood that for the sake of simplicity and reducing the complexity of this discussion several of the system components will be referred to as computers or servers. In practice, any of these computers or servers may be cloud-based computing systems such as virtual server instances running on a cloud computing platform. The functions described are the same or similar in both server-based and cloud-based implementations.

Figure 1:
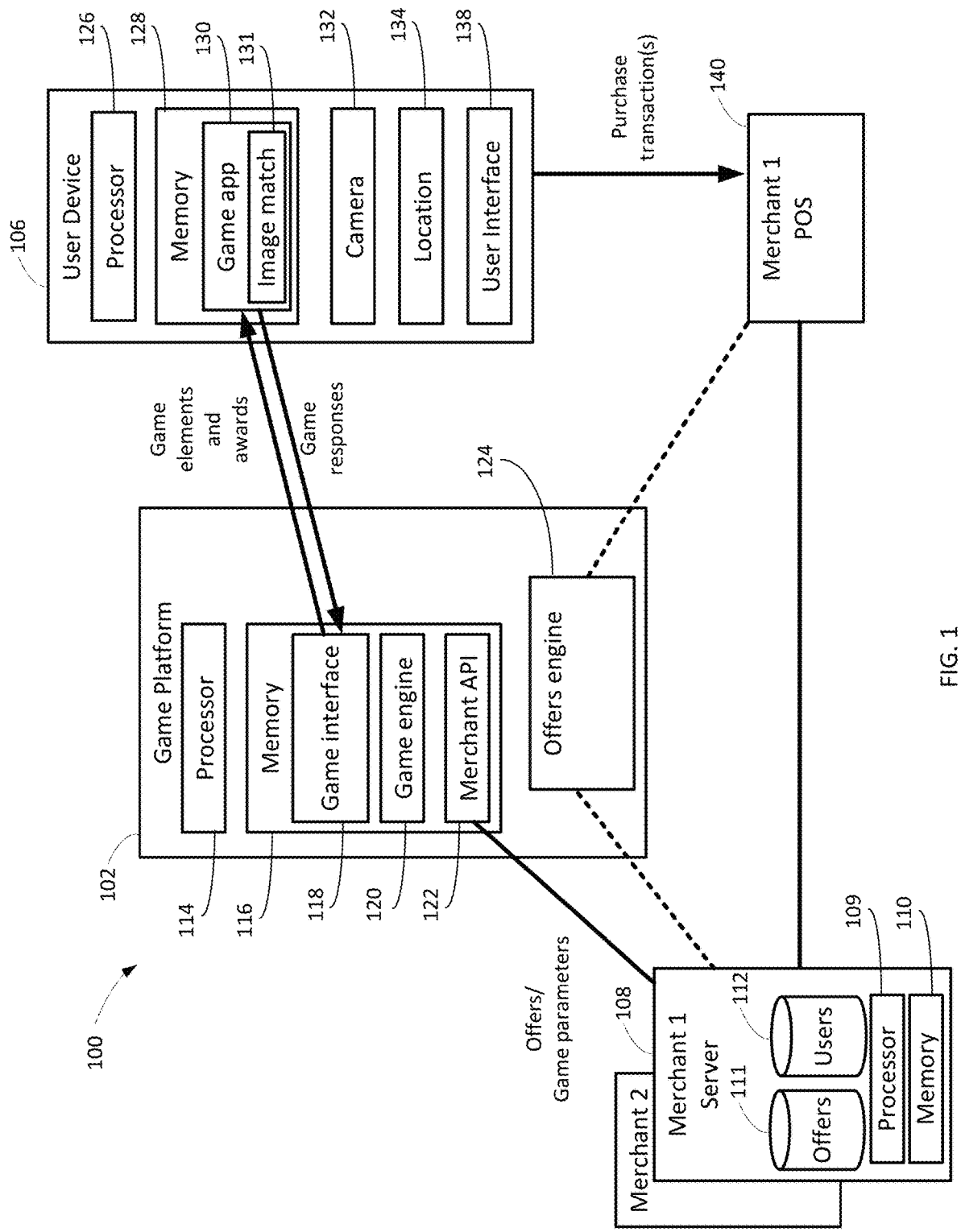
FIG. 1 is a block diagram of entities participating in an augmented reality (AR) based gamification of offers.

Turning to FIG. 1, a system 100 supporting augmented reality loyalty program offerings is discussed and described. A game platform 102 may be coupled to both a user computing device 106 and a merchant server 108. Additional merchant servers may be found in some embodiments as well as any number of user computing devices (not depicted).

The merchant server 108 may include a processor 109 and memory 110 supporting the execution of various programs stored in the memory 110 and executed on the processor 109. An offers database 111 may store past award offers as well as current and planned offers. A user database 112 may store information about user preferences, previous participation in games and offers, previous awards, etc. When an offer is made to a user, the offer may be selected from the offers database 111 directly or an offer may be generated in real time based on the combination of offer information and user information from the respective databases.

The game platform 102 may include a processor 114 and memory 116. The memory 116, as with the other memories discussed, may be a physical memory including RAM, ROM, flash, rotating storage, optical media, etc., but does not include transitory media such as carrier wave or propagated media types of memory. The memory 116 may include various modules or programs including well-known programs such as an operating system and network interfaces. The memory 116 may also include executable code that implement a game interface 118 and a game engine 120. The game engine 120 and game interface 118 may operate together to receive data from the computing device 106, generate game elements, and send the relevant instructions related to game elements to the computing device 106 to effect game play on the computing device. The game play aspects are discussed in more detail below.

The memory 116 may also include a merchant application program interface (API) 122. The merchant API 122 may expose calls or methods that allow the merchant to specify various aspects of customer/user experience including award offers and amount, award conditions, as well as game play requirements and game features. Various aspects of the game options are discussed in more detail below.

The user computing device 106 may be a cellular telephone, a smart phone, a tablet, notebook, or other personal computing device. The user computing device 106 may include a processor 126 and memory 128. The memory 128 may include, among other standard programs such as an operating system and utilities, a game application 130 that interacts with the game interface 118 and presents game elements to a user when playing the game on the computing device 106. The user computing device 105 may also include hardware components including a camera 132, a location system 134 such as a GPS receiver, and a user interface 138 such as a touchscreen display. In an additional embodiment, a wearable device that is capable of interfacing with a location based computing device such as the POS system (described below) may be used to enable the system.

As discussed more below, the user computing device 106 may use images captured by the camera 132 to determine the location of the computing device 106 in the interior of the merchant premise when a GPS system may not be effective. In other embodiments, the location system 134 may include other location capabilities useful to in-building location related to game play such as signpost transmitters or WiFi access point mapping.

A merchant point-of-sale system (POS) 140 may be used in processing a transaction when redeeming an award. The POS 140 may be in communication with the merchant server 108 for transaction processing, loyalty data, etc. The POS 140, in one embodiment, may also provide data to an offers engine 124 used to evaluate effectiveness of previous offers and develop new offers for use in upcoming campaigns. The offers engine 124 may also track game participation, game completion, and award redemption in order to evaluate effectiveness of offers both at the aggregate level and at the individual level.

In some embodiments, a machine learning tool may be used to evaluate the effects of certain offers in order to train the tool to select offers and game play combinations that improve take-up on offers and improve brand loyalty. The offers engine 124 may be embodied in the game platform 102, as shown, or may be hosted by any of several other entities including, but not limited to, the merchant server 108, or a transaction processor or other independent entity (not depicted).

Figure 2:
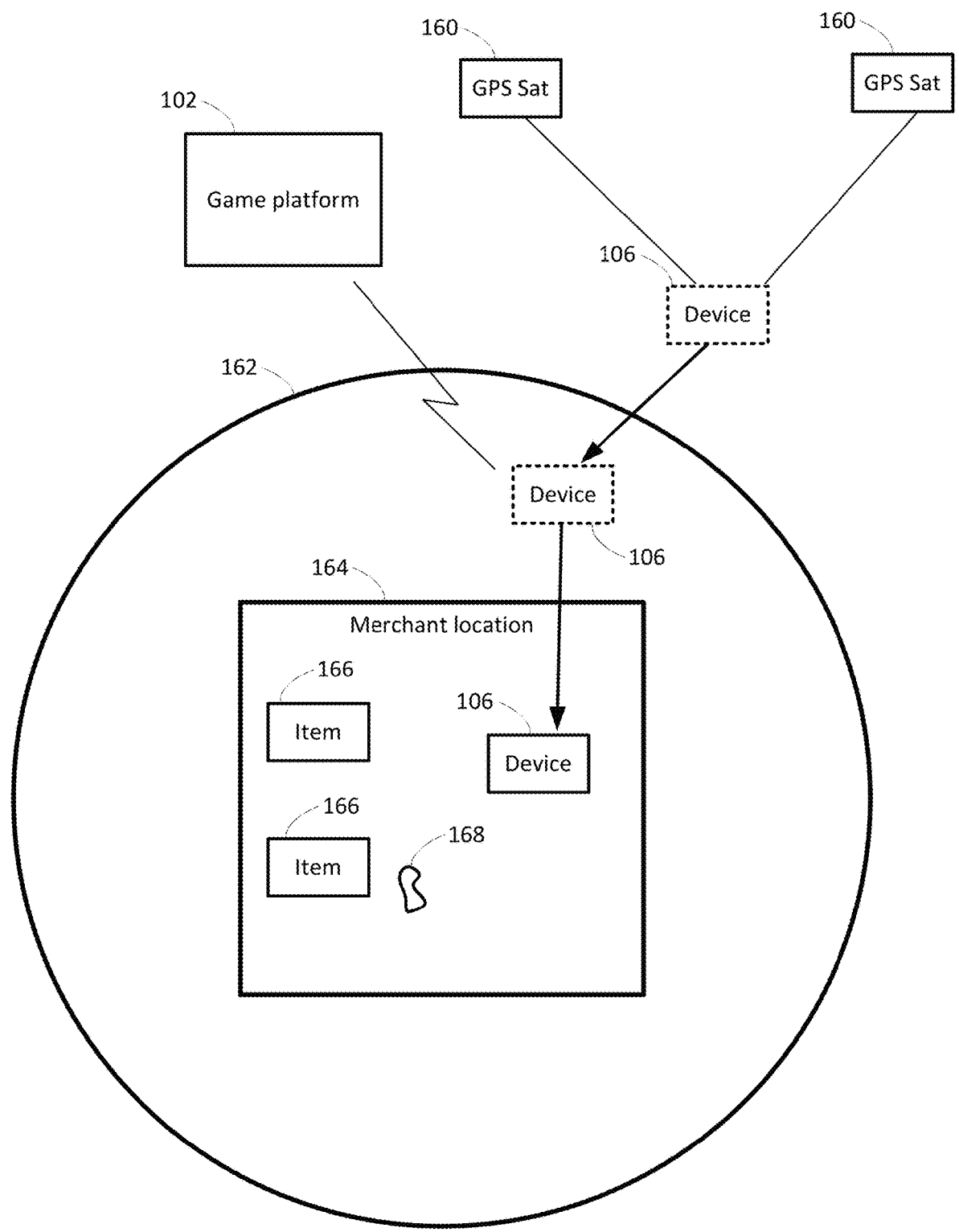
FIG. 2 is a block diagram illustrating physical aspects of the use of the AR gamification system.

FIG. 2 depicts some of the physical elements of the system 100. Signals from GPS satellites 160 may be detected in a known fashion so that the computing device 106 can determine its location, especially in an outdoor space. As the computing device 106 moves, the game platform, or the game application 130 on the computing device 106, monitors the location of the computing device 106. As the computing device 106 enters a predetermined geographic region 162 around a merchant location 164, the game platform 102 may send a signal to the computing device 106 indicating to the user of the computing device 106 that a participating merchant is in the vicinity of the merchant location 164. In another embodiment, the game application 130 may be pre-loaded with merchant locations and associated geographic locations around those merchant locations.

Store items 166 may be present in the merchant location 164. A virtual image of a game icon 168 may be geo-located within the merchant location 164. In some embodiments, the location of the game icon 168 may be in relation to specific product or may be placed in a specific product department to draw the user to that area of store. In such an embodiment, the icon 168 may have a graphical appearance of the product. That is, the game may retrieve an image of the product from the game platform 102. In other embodiments, the location of the computing device within the merchant location may be determined by matching a real time image of products, displays, architectural elements, etc., (more generally, artifacts) with previously stored images of those artifacts. In some cases, the award, such as a discount or cash back, may be tied to the purchase of a specific product. In other cases, the location of the game icon 168 may be unrelated to the award.

A technology problem addressed by this system is identifying the in-building location of the computing device 106 relative to the product or products to which game play is directed. The solution to this technology problem may be addressed, in one embodiment, by having the merchant capture one or more target images of a product or a store location where the game is to be carried out and associate the target images with a game-based offer. The game application 130 may then use an image matching process 131 to compare in real time images captured by the camera 132 to the one or more target images. When the real time image is matched to one or more of the target images, the game may proceed to another step based on the location of the computing device 106. In an embodiment, a three dimensional image may be captured and compared to the real time image using something similar to the Microsoft Photosynth application as an example and not a limitation. In such a case, a point matching algorithm may determine a match even when the user may approach the desired location from different angles.

Figure 3:
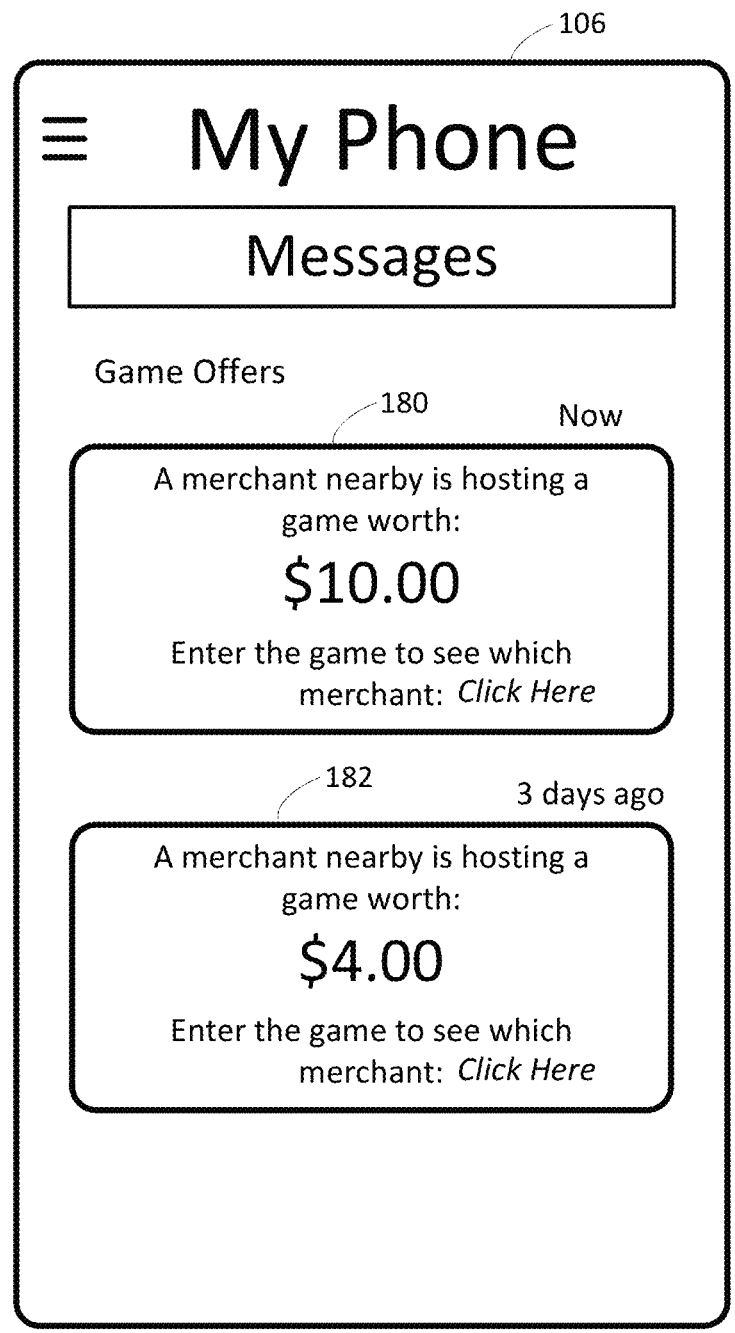
FIG. 3 illustrates a user interface of a computing device associated with the AR gamification system.

In an embodiment, the user may interact with the game platform 102 or the game application 130, as depicted in FIG. 3, by viewing a message indicating the availability of a sponsored game. As illustrated, a current offer 180 may be displayed to the user, indicating that a nearby merchant is hosting a game and the possible value of an award associated with completion of the game. A previous offer 182 may be displayed in this depiction of messages being received at text (SMS) messages. In other embodiments, the game application 130 may display this invitation message.

Figure 4:
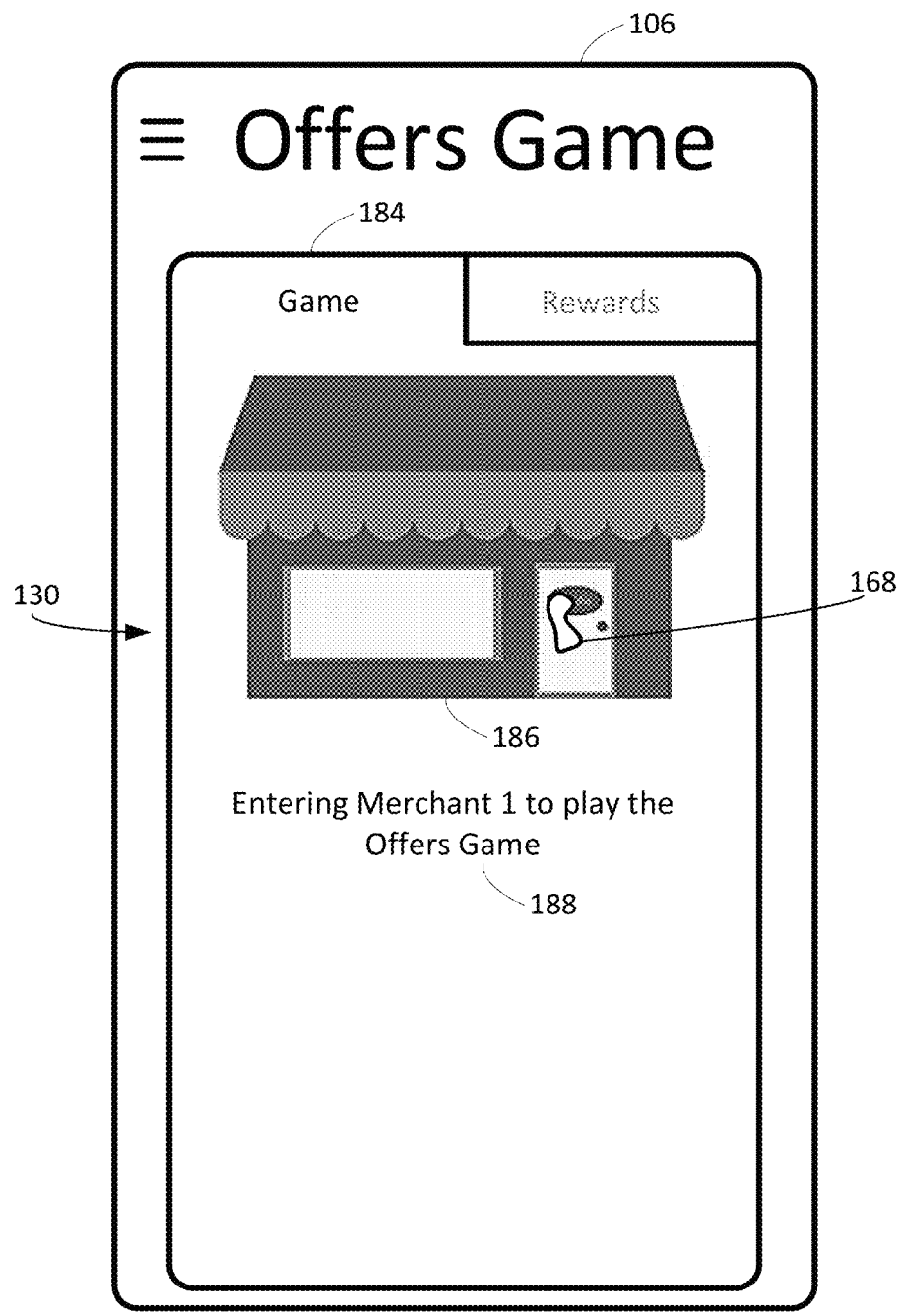
FIG. 4 illustrates a user interface of a computing device initiating game play in the AR gamification system.

Upon accepting the offer to play the game, the user may be presented with a previously captured view of the merchant location 164 or an augmented reality view 186 of the merchant location 164, as shown in FIG. 4. The view 186 of the merchant location 164 may be displayed in a game tab 184 of the game application 130 displayed via the user interface 138 of the computing device 106. The view 186 of the merchant location 164 including an icon 168 may be the first step in the game play where the user scans the current locations and makes the identification of the particular store hosting the current game. A status message 188 may indicate to the user that the game is about to begin. In other embodiments, the first stage of game play may simply be a message identifying the name and/or address of the merchant. For example, it may not be simple or effective for a user to identify a mall-based merchant simply by a storefront image, so in some cases additional or different details may be provided.

Figure 5:
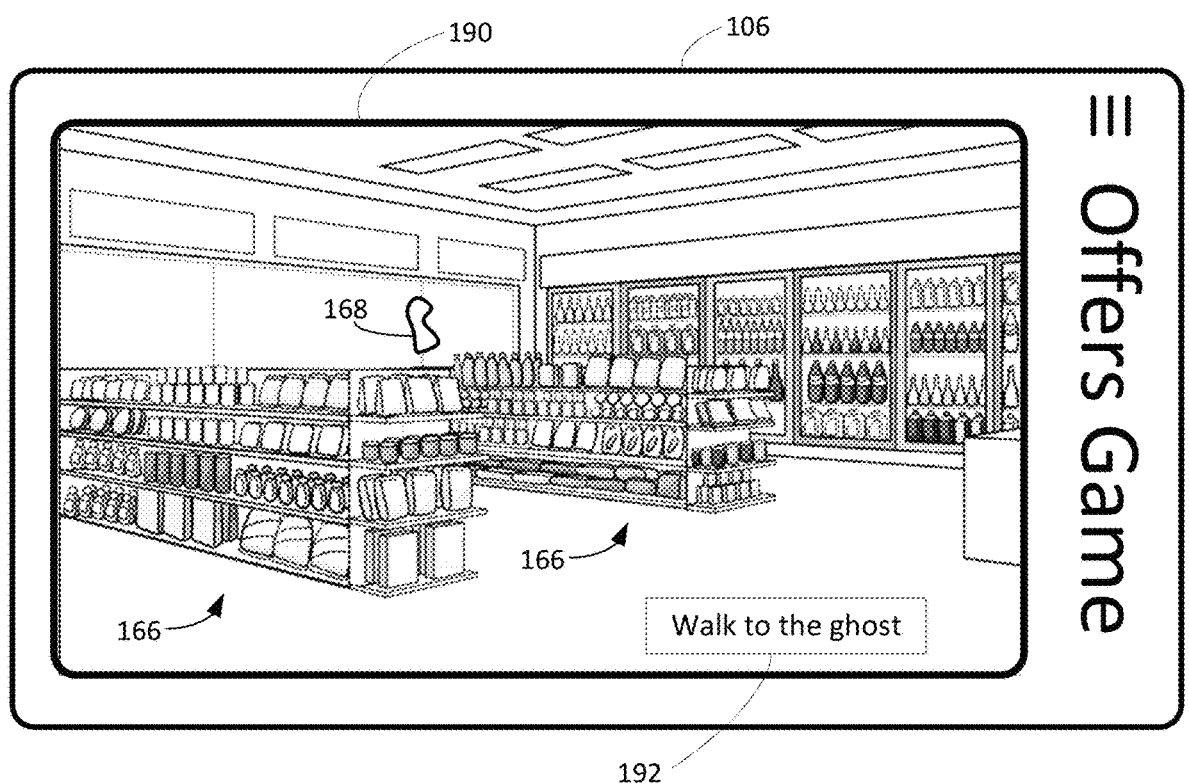
FIG. 5 illustrates an exemplary screen showing a user interface of a computing device engaged with the AR gamification system.

FIG. 5 illustrates one embodiment of game play once a user is in the merchant location 164, and, optionally, at a predetermined location within the building. In this illustration, store items 166 such as the illustrated gondolas of merchandise may be displayed via an image captured by the camera 132 and an icon 168 may be placed via AR in the vicinity. An instruction 192 may be displayed for the user. Obviously, many different AR game interactions may be supported depending on the nature of the award and the game requirements specified by the merchant or other award sponsor. For example, the AR overlay may be a product or may be an imaginary item, as illustrated.

In various embodiments the user may be required to interact with only a single real or virtual object to qualify or the user may be required to interact with multiple real or virtual items in order to complete the game and qualify for the award. In some embodiments, the AR overlay may move through the store, leading the user through various departments or product areas. In yet other embodiments, the user may be required to interact with a store employee as indicated by a virtual assistant. In some cases, multiple visits to the same location or different locations may be required, as may some level of qualifying purchases be made through a co-sponsor such as a payment service like Visa Checkout.

Figure 6:
FIG. 6 illustrates a user interface of a computing device showing completion of a game.

FIG. 6 illustrates an exemplary depiction of a completed game notification in the game tab 184. The view 186 of the merchant location 164 may be depicted as well as a completion notification 194 and an instruction 196 related to redeeming the award. The successful completion of the game may qualify the user for an award or may be a step in completing a more complex qualification process.

Figure 7:
FIG. 7 illustrates an embodiment of display of an award associated with completion of the game.

FIG. 7 may illustrate a rewards tab 200 of the exemplary offers game. In this tab 200 one or more awards may be presented in various forms including reference number, barcode, text instructions, or as illustrated, a two-dimensional barcode. A current award certificate 202 may be presented as well as a previous offer 204. When an offer has been redeemed or has expired, coordination between the merchant server 108 and the game platform 102 may remove such awards. In another embodiment, the awards may simply be made by statement credit or processed out-of-band from the game platform. For example, awards may be presented via email or as a social media message.

Figure 8:
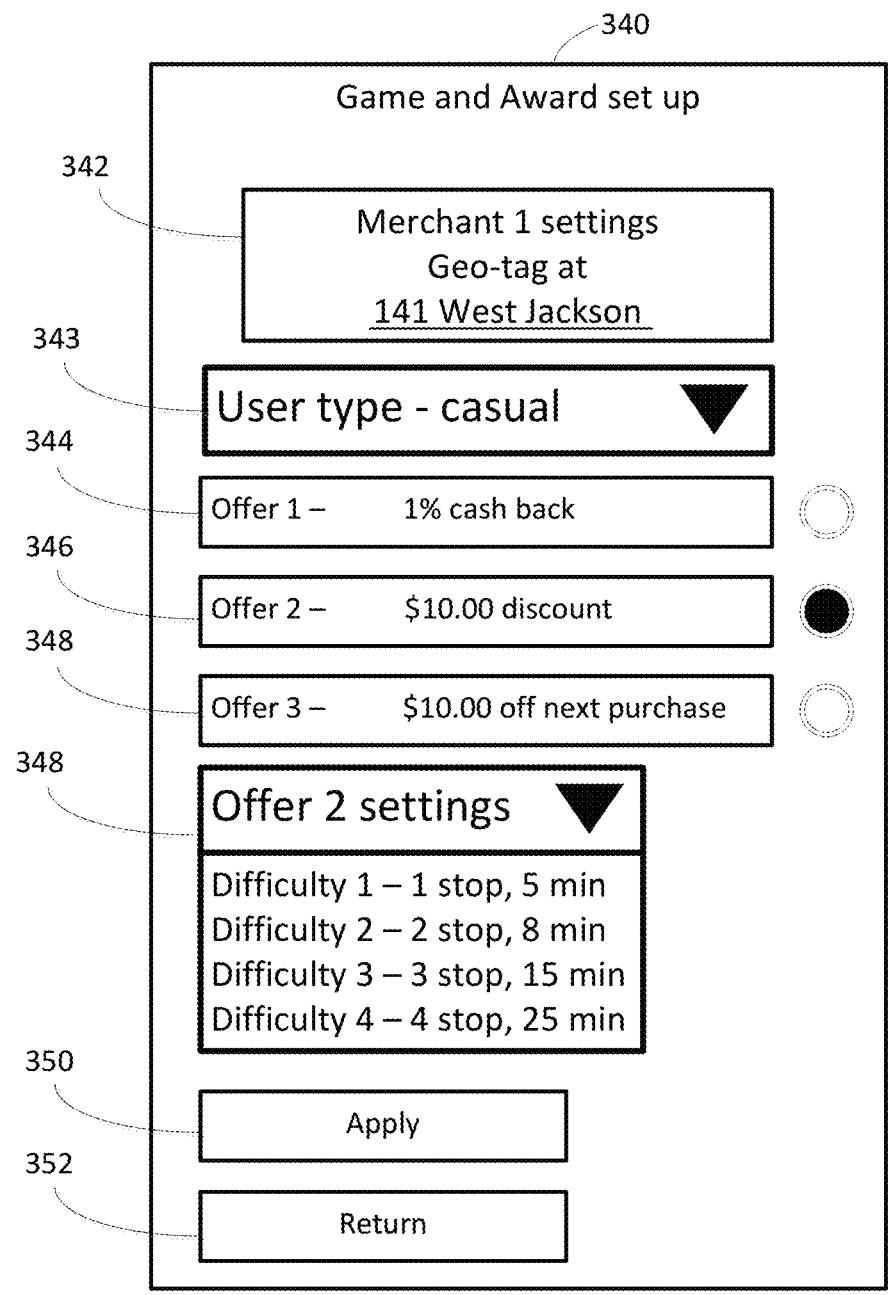
FIG. 8 illustrates an exemplary merchant set up interface for the AR gamification system.

FIG. 8 may illustrate one possible embodiment of a merchant interface 340 for specifying awards and game selection. The merchant interface 340 may present user interface elements exposed by the merchant API 122 hosted at the game platform 102. In different embodiments, the merchant interface 340 may use a client application at the merchant server 108 or may simply be presented via a browser (not depicted). In the latter case, the merchant API 122 may include a web host function supporting the browser interface.

A location window 342 may be used to specify the location. In an embodiment, the geographic region may be drawn around a location as illustrated in FIG. 2 or in another embodiment, a radius may simply be circumscribed around the specified location. As discussed above, multiple part games and/or related purchases may be used in some embodiments to create more complex qualifications. The offers engine 124 may adapt to a particular user or user category to develop suggestions to a merchant for offers and awards as illustrated below with respect to FIG. 8. For example, when a user type is selected as "casual," various selection boxes 344, 346, 348 for suggested offers may be presented for selection by a radio button. Other user types may include "gamer," "loyal," or "new," as examples. In these cases, appropriate award types and game specifications may be suggested. In some embodiments the nature of the user computing device 106 may be incorporated in game selection, reflecting the capabilities of the computing device 106. In other embodiments, the merchant may simply select an award amount.

An offer settings entry box 348 may include a drop down menu of game type/difficultly level for the selected award value, in the illustration, offer 2. Various difficulties may be specified as reflected by the number of steps, the expected time, or both. Other level or difficulty indicators may be used as well. Ultimately, the merchant or its representative will determine the game type and expected investment required of the user/player. Administrative buttons, "Apply" 350 and "Cancel" 352 may complete the merchant interface 340.

Other interface elements may be present, depending on the design and implementation of the interface 340.

Figure 9:
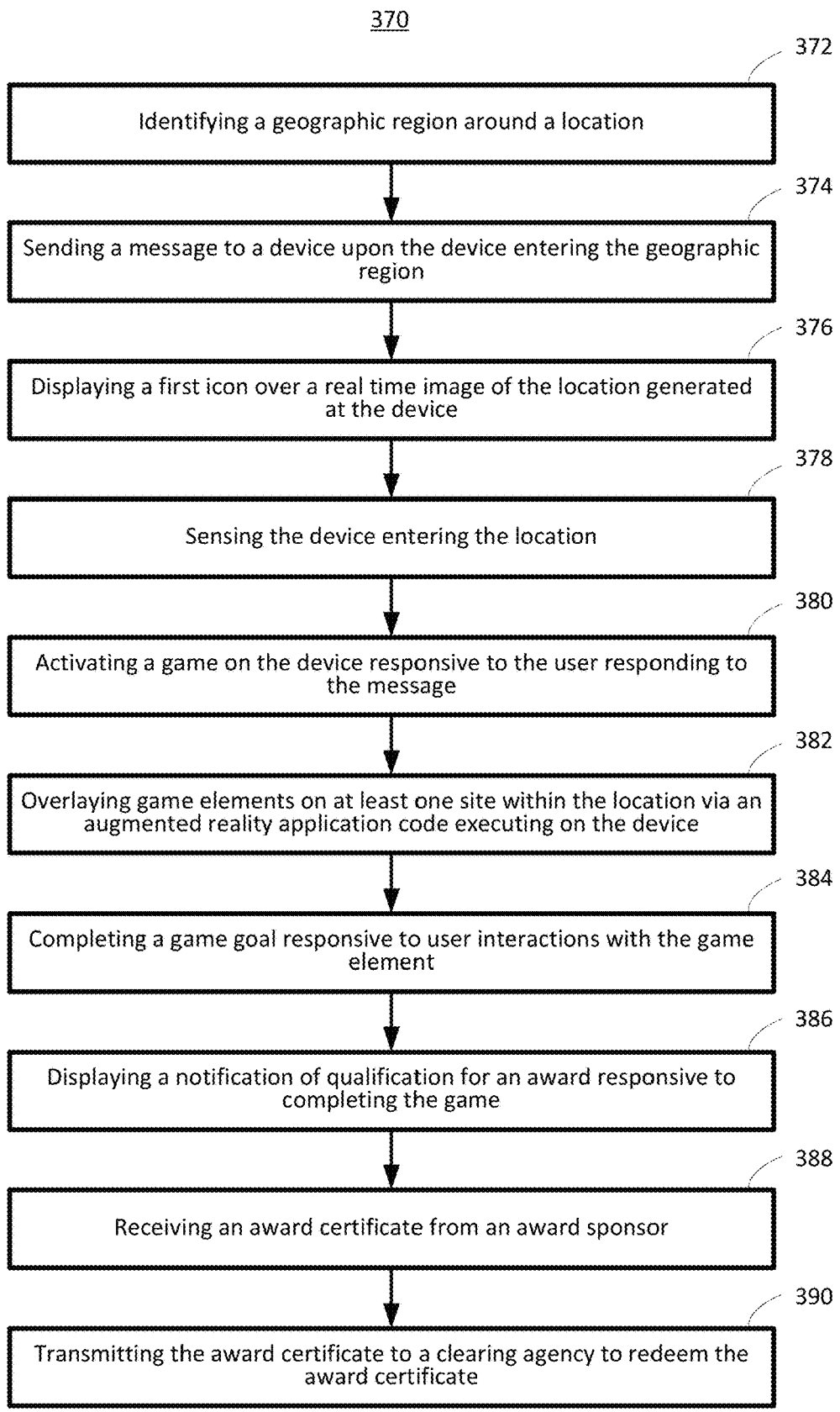
FIG. 9 is a flowchart of a method of performing gamification of offers.

FIG. 9 is a flowchart of a method 370 of generating human traffic at a location. That is, a system of servers, computing devices, and programs may be used to provide a tangible experience to a person that motivates that person to enter a structure for the purpose of gameplay that when successfully concluded, results in a material award for the person.

At block 372, a geographic region around a location may be identified. In an embodiment, the location corresponds to an award sponsor, such as a merchant's brick and mortar store location. In other embodiments, the location may be an affiliated establishment, such as a partner business cooperating in a multiple location game activity. The identification of the geographic region around the location may include receiving a designation of the geographic region at a game server from the award sponsor. In an embodiment, the designation may be made via an application program interface hosted at the game server.

At block 374, a message may be sent to a computing device 106 responsive to the computing device entering the geographic region. The message may indicate that the computing device 106 is in the defined geographic region 162 of a location 164 hosting a game and may also include an indication of the type and value of the award.

In an embodiment, the user may, at block 376, activate the game 130 on the computing device 106 so that an icon 168 is displayed over a real time image of the location generated at the computing device 106 indicating which location is hosting the game. In this embodiment, the game 130 may identify the merchant using image matching techniques and overlay the icon image 168 onto the real time image. If the computing device 106 is not facing the merchant storefront, the icon 168 may move or be placed in a position to indicate to the user to turn the computing device 106 toward the merchant. In other embodiments, the message may include the name or address of the store so that game play begins upon entering the location 164.

Various techniques may be used, at block 378, to determine when the computing device 106 enters the merchant location 164. For example, if the game 130 is active, the game 130 may compare real time images to stored image data to identify not only that the computing device 106 has entered the location 164 but may also indicate where the computing device 106 is within the location. In other embodiments, the computing device 106 may sense an anti-theft computing device at a door or may identify WiFi access points to determine that the computing device 106 is within the location 164 and, in some cases, where within the location 164. Other location technologies may be used such as signpost transmitters, infrared beacons when the camera 132 is capable of sensing such signals, or other in-building location technologies. In some cases, in-building location may be supported by interior GPS relays or the triangulation of cellular telephone tower signals.

At block 380, the game may be activated responsive to the user receiving the message indicating the availability of the game at the merchant location. The activation of the game may be when the computing device 106 is still outside the location 164 or after the computing device enters the location 164. In one embodiment, the activation may responsive to the user interacting with a pop-up or similar message asking permission to activate the game. In other embodiments, the user may set a default that causes the game to activate automatically upon receipt of the message indicating game play is available. Depending on settings, the game 130 may be automatically activated whenever the computing device 106 is within a region 162 supporting game play or the game may be manually started by the user.

During game play, at block 382, game elements, such as icon 168, may be overlaid on images of at least one site within the location 164 via the game executing augmented reality application code on the computing device. In other embodiments, multiple game elements may be displayed.

At block 384, a game goal may be completed responsive to user interactions with the game elements. For example, a user may be required to interact with the icon 168 via a user interface element. In another case, the user may be required to interact with specific physical items within the location 164, such as taking a photo of an item or scanning a barcode/2D barcode. As mentioned above, some games may be successfully completed with a single interaction while other games may require multiple interactions for completion.

Upon successful completion of the game, at block 386, a notification 194 of qualification for an award. The notification 194 may be displayed via the game 130 itself or may be sent via another message service, such as a text message or email. At block 388 an award certificate 202 may be received at the computing device 106 either with the notification 194 or subsequent to the notification. In some cases, such as an award involving a statement credit, no actual award certificate 202 may be sent. In cases where the award certificate 202 is transmitted, or pushed, to the computing device 106, the award certificate 202 may take the form of a barcode or 2D barcode, as illustrated in FIG. 7. The award certificate 202 may be issued by an award sponsor, such as the merchant, or may be issued by a third party, such as the game server operator, or a transaction processor.

Once the award certificate 202 is received at the computing device 106, at block 390, the award certificate 202 may be displayed at a retail point-of-sale computing device or at the award sponsor to redeem the award. The award certificate 202 may be stored in the memory 128 of the computing device 106 and may be accessed via a user interface command hosted by the game 130 or may be accessed by the operating system of the computing device 106 as any other stored file may be accessed. While some award certificates 202 may be presented optically via a scanner at the point-of-sale computing device, the award certificate 202 may also be presented as a file transfer from the computing device 106 to another authorized computing device that will process the redemption of the award.

In other cases, the presentation of the award certificate 202 may simply provide access to another level of the game 130, usually in conjunction with a larger or more lucrative award associated with completing multiple levels of the game 130, such as a financial incentive on a future purchase. Such a multi-level or multi-part game 130 may require the user to spend proportionally more time at the location or interacting with the game itself. In yet another embodiment, the award may be in the form of loyalty points added to a customer's new or existing loyalty program of the merchant. In another example, a co-marketing agreement between the merchant and an airline may allow award miles to be granted for the user's participation in the game at the merchant location.

A technology problem solved is a lack of system linkage between a user computing device, its location data and the retail systems of a merchant. This missing linkage results in inefficiencies that are solved by computer technology including the user interface generated at the computing device and the real time connection between the inventory system of only nearby merchant systems and the user computing device. A technical effect of the system, beyond the in-building matching discussed above, is the coordination of game platform 102 interactions with the user computing device 106 based on real time data received from the computing device 106 such as images and location information. For example, matching real time images captured at the computing device 106 with previously stored images from the merchant location 164 requires a high degree of processing to accommodate differences in angle and lighting. Unlike a simple AR game based solely on GPS location, the system and method described here may use a more sophisticated interaction between the game icons 168 and the physical surroundings. The merchant server 108 also has a technical effect in implementing the merchant interface 340 based on interactions with the merchant API 122.

A system and method in accordance with the current disclosure benefits both merchants and users. The merchant has an effective system for targeting, selecting, and implementing customer and potential customer interactions that has not been available previously and that targets an audience not typically reached by traditional print and broadcast advertising. The user/customer also benefits by receiving award value for an activity which they would likely participate in even without the award, as evidenced by the popularity of activities like geo-caching.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

I claim:

1. A method for providing man-machine interactions at a location, the method comprising:
   identifying a geographic region around a location, the location corresponding to an award sponsor hosting a game;
   determining if a computing device has entered the geographic region;
   in response to the computing device entering the geographic region, receiving a message on the computing device indicating that the computing device has entered the geographic region of the location hosting the game;
   receiving an indication from the computing device in response to the message to activate a game on the computing device;
   displaying an icon over a real time image of an exterior of the location to guide a user of the computing device to the location hosting the game;
   sensing the computing device entering the location by identifying an interior of the location using a camera of the computing device;

projecting game elements on at least one site within the location via an augmented reality application code executing on the computing device;

completing a game goal responsive to user interactions with the game elements;

determining a qualification for an award responsive to completing the game;

displaying a notification of the qualification for an award responsive to completing the game;

receiving, at the computing device, an award certificate from the award sponsor; and displaying the award certificate at the award sponsor to redeem the award.

2. The method of claim 1, wherein projecting game elements on at least one site within the location comprises projecting an icon of a product at a position proximate a physical product in an augmented reality view of the at least one site, and wherein the icon has a graphical appearance of the physical product.

3. The method of claim 1, further comprising sensing the computing device entering the location by sensing a position of the computing device using a location technology.

4. The method of claim 3, wherein the location technology is one of a GPS receiver, identification of a WiFi source, triangulation of cellular telephone tower signals, or a beacon signal broadcast within the location.

5. The method of claim 1, further comprising identifying the location at the computing device by displaying a first icon over a real time image of the location generated at the computing device.

6. The method of claim 1, wherein identifying the geographic region around the location comprises receiving a designation of the geographic region at a game server from the award sponsor, via an application program interface hosted at the game server.

7. The method of claim 1, wherein receiving the award certificate from the award sponsor comprises:

receiving the award certificate at a game server; and pushing the award certificate to the computing device responsive to determining the game has been completed.

8. The method of claim 7, wherein displaying the award certificate comprises:

receiving the award certificate at the computing device from the game server;

storing the award certificate in a memory of the computing device;

retrieving the award certificate responsive to a command received via a user interface of the computing device; and presenting the award certificate to a point of sale apparatus.

9. The method of claim 8, wherein presenting the award certificate comprises transmitting a digital file containing the award certificate to the point of sale apparatus.

10. The method of claim 8, wherein presenting the award certificate comprises displaying the award certificate for scanning by the point of sale apparatus.

11. The method of claim 1, further comprising: selecting a second game and a second award for the computing device based on completing the game.

12. The method of claim 11, wherein selecting the second game and second award further comprises selection of an increased award value for a game requiring proportionally more time at the location.

13. The method of claim 1, wherein the award certificate provides access to a second level of the game, wherein completion of the second level of the game provides a financial incentive related to a purchase.

14. A system for providing man-machine interactions at a location, the system comprising:

a gaming server including:

a first processor and a memory;

executable code stored in the memory and executed by the first processor to implement an application program interface (API) supporting communication from a plurality of award providers, the API providing entry points for i) specifying a geographic location around an award provider location, ii) specifying game play parameters; iii) providing award information, and iv) providing encoded award certificates;

a game engine that calculates and provides game elements to a computing device, the game engine further determining when a game is successfully completed;

a game interface that communicates with a computing device operated by a user, the game engine and the game interface operating to determine if the computing device has entered a geographic region around a location corresponding to one of the plurality of award providers hosting a game and, in response to determining that the computing device has entered the geographic region, displaying an icon over a real time image of an exterior of the location to guide a user of the computing device to the location hosting the game, the game engine and the game interface further operating to sense the computing device entering the location by identifying an interior of the location using a camera of the computing device;

an award interface that manages delivery of encoded award certificates to the computing device; and the computing device including:

a computing device processor and computing device memory;

executable code stored in the memory of the computing device and executed by the computing device processor to implement a game application;

a location unit with a receiver, wherein the receiver captures a signal from an outside source and calculates a location of the computing device based on the signal;

the camera that captures images and provides the images to the game application;

a network interface that receives game data from the game interface and sends data from the game to the game interface; and a user interface that displays images generated by the game application and receives input from the user.

15. The system of claim 14, further comprising a merchant server coupled to the gaming server, the merchant server providing game and award-related instructions to the gaming server via the API.

16. A method for providing man-machine interactions at a location, the method comprising:

identifying a geographic region around a location, the location corresponding to an award sponsor;

determining if a computing device has entered the geographic region;

in response to the computing device entering the geographic region, receiving a message on the computing device indicating that the computing device has entered the geographic region of the location hosting the game;

receiving an indication from the computing device in response to the message to activate a game on the computing device;

displaying an icon over a real time image of an exterior of the location to guide a user of the computing device to the location hosting the game;

sensing the computing device entering the location;

projecting game elements on at least one site within the location via an augmented reality application code executing on the computing device, wherein projecting game elements on at least one site within the location comprises projecting an icon of a product at a position proximate the physical product;

completing a game goal responsive to user interactions with the game elements;

determining a qualification for an award responsive to completing the game;

displaying a notification of the qualification for an award responsive to completing the game;

receiving, at the computing device, an award certificate from the award sponsor; and displaying the award certificate at the award sponsor to redeem the award.

17. The method of claim 16, further comprising matching a real-time image of an in-building artifact of the location with a previously stored image of the in-building artifact.

18. The method of claim 16, wherein the icon has a graphical appearance of the product.

\* \* \* \* \*